June 30, 1942. N. BELAEF 2,288,064
TIME CYCLE CONTROL MECHANISM
Filed Nov. 13, 1939 2 Sheets-Sheet 1
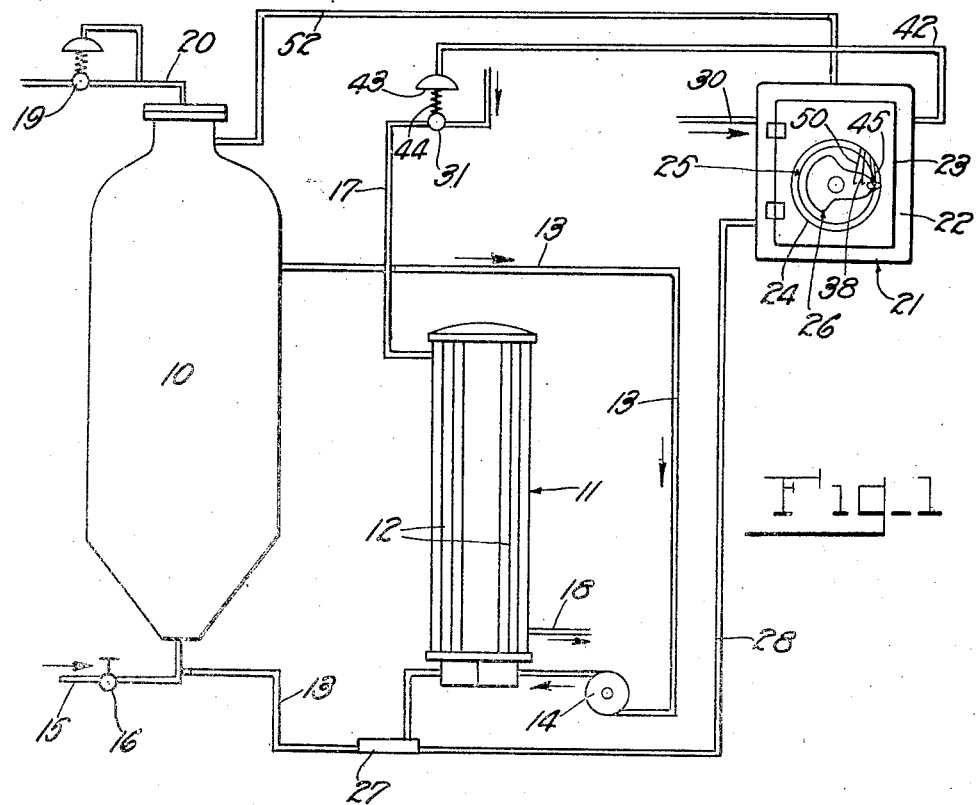
Fig. 1
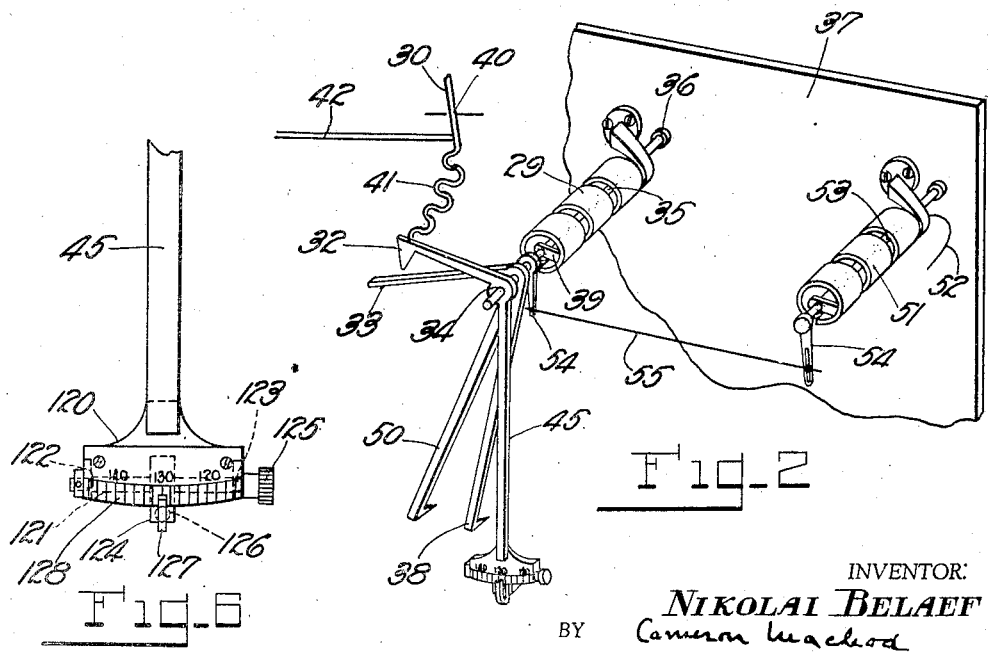
Fig. 2
Fig. 6
INVENTOR:
NIKOLAI BELAEF
BY Cameron MacLeod
ATTORNEY.

June 30, 1942. N. BELAEF 2,288,064
TIME CYCLE CONTROL MECHANISM
Filed Nov. 13, 1939 2 Sheets-Sheet 2
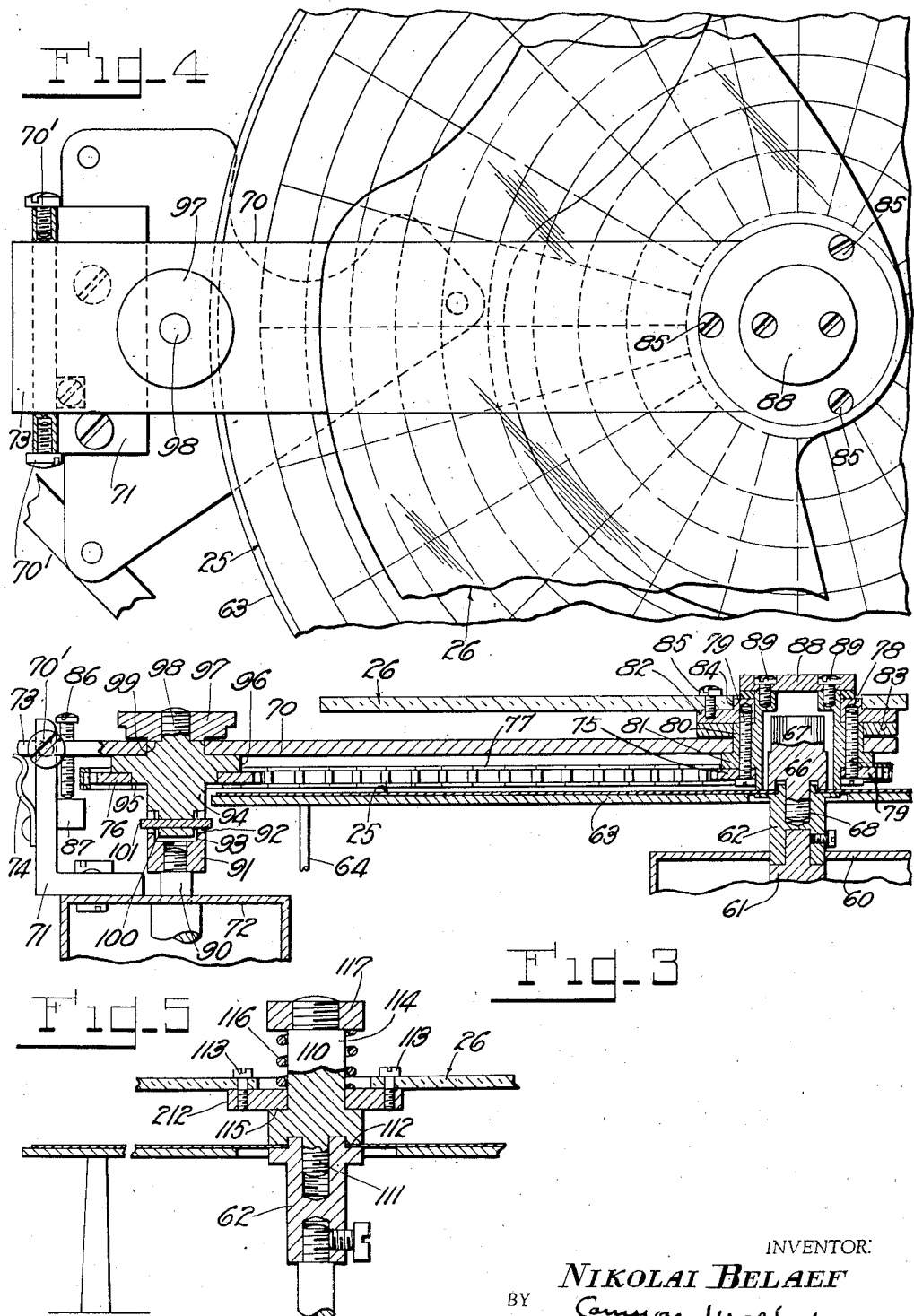
INVENTOR:
NIKOLAI BELAEF
BY Cannon MacLeod
ATTORNEY.

Patented June 30, 1942

2,288,064

UNITED STATES PATENT OFFICE 2,288,064

TIME CYCLE CONTROL MECHANISM

Nikolai Belaef, Boston, Mass., assignor to Mason-Neilan Regulator Company, Boston, Mass., a voluntary trust of Massachusetts Application November 13, 1939, Serial No. 304,086

6 Claims. (Cl. 236—46)

This invention relates to automatic control mechanism for governing the magnitude of a variable in accordance with a predetermined cycle of operation in respect to time and particularly to the control and recording of the operating cycle.

Where time cycle controls are used for governing temperature, pressure, flow, or the like in accordance with a predetermined value curve over definite periods of time, it has been customary to maintain the magnitude of the variable at the control setting by an instrument or similar device and to reset the control point automatically by a clock-driven cam over a definite time period in accordance with a predetermined value curve as required by the process.

In many processes such, by way of illustration, as the control of a digester cook, the temperature must adhere closely to the plotted temperature curve and therefore the cam which guides the control setting must be extremely accurate. While cams having a relatively small operating surface are more suited to the limited amount of space available in the average controller assembly, they are not very practical, especially where accurate control is required. Because of the small operating surface, extreme accuracy is demanded in the manufacture of the small cam if errors are to be avoided. Furthermore, the limited operating surface affords correspondingly limited movements to the instrument reset mechanism, requiring great care in the manufacture and arrangement of the parts. Again, the small cam is not adapted for certain control operations, as when the slope of the cam is too steep to actuate the reset mechanism, which may occur with slow chart rotation or when the working part of the cycle is of short duration. Still another difficulty arises from the use of small cams, namely the trouble involved in correlating the cam position against the chart record due to the difference in size of the operating curve represented by the cam and that plotted on the chart.

For these reasons and others not enumerated, the most practical cam to use is one having an operating surface contour which conforms substantially in size to the control curve recorded on the chart. Such a cam is more adapted to general conditions, is easier to manufacture with reasonable accuracy, and is better suited to actuate the average reset mechanism. While this type of cam is far better for control purposes, it is not suited to be incorporated into the instrument assembly where chart records are required. As is well known to those skilled in the art, it is usual to mount various instrument assemblies in standard instrument cases, one type of case being used for a recording instrument and another type of case for an indicating instrument. Definite standards are adhered to by each manufacturer to enable the cases to be produced in quantity by economical methods. Where no chart record is demanded the recording case is exactly suited to the time cycle controller assembly, as the space reserved for the chart is used for the large cam and the cam is mounted on the standard chart shaft and driven by the clock mechanism. However, when a chart record is required the recorder instrument case is not suited to the time cycle controller assembly, for with the conventional cam now used there is no suitable space for both the cam and chart. If the chart and cam are both mounted on a shaft with the chart in front of the cam, the cam is covered by the chart, is inaccessible, and it is difficult to correlate the cam position against the chart; whereas if the chart is mounted behind the cam, much of the chart record is covered and the view of the operator is obstructed. For this reason, while it is possible to mount the conventional cam in front of a chart, it has been found preferable to use a recorder instrument case for the cam-operated time cycle controller assembly and to use a separate case for the recorder assembly, driven either by a separate clock mechanism or by the controller mechanism through operating connections. This not only adds materially to the expense of the installation but adds to the space required, which is often limited, and also increases the difficulty of correlating the cam position against the chart record.

Furthermore, I find that it is often advantageous in certain time cycle process controls to be able to vary the instrument setting in respect to the cam contour. This is true, for example, in governing the temperature of a digester cook, referred to above, where the maximum temperature may vary from one cook to another and where a single master cam may be used for varying the instrument control point setting arm relatively to the cam operating surface, thereby enabling one master cam to do the work of many cams of different sizes. In accordance with the present invention the control point set arm may be adjusted to any desired value represented by the chart and a clear view of the pen and chart record may be obtained even though the setting is inside of the cam periphery.

Again, I have found that even with a large cam it is sometimes necessary to rotate the cam at a different speed than that of the chart, as is desirable when the slope of the cam is too steep to be used with slow chart rotation, or when the working part of the cycle is of short duration, and I have therefore provided means in combination with other elements of my invention for rotating the cam and chart at different speeds where necessary to meet the process conditions.

It is an object of this invention to provide a time cycle control mechanism having a cam which, if desired, may be made to conform substantially to a plotted curve on a chart of any standard size and which may be used with the chart in the same instrument case, the arrangement and construction being such that an unobstructed view of the chart record is afforded.

It is another object of this invention to so arrange the parts that both the cam and chart are readily accessible.

It is still another object of this invention to provide means for easy correlation of the cam position against the chart record.

It is still another object of this invention to enable a single master cam to be used in combination with an adjustable controller arm actuating mechanism for varying the control point relatively to the cam contour for different cycles of operation and for affording an unobstructed chart record at all positions of adjustment.

It is still another object of this invention to provide novel means in combination with the other parts for driving the cam and chart at different speeds when required.

As an aid in the description of a time cycle controller mechanism embodying my invention and to set forth more clearly some of its advantages for process control, I have elected to show it as applied to a digester for controlling the temperature of successive cooks in accordance with predetermined temperature curves and for recording both the temperature of the cooks and the digester pressure. It will be understood that the apparatus is shown in connection with a digester only by way of illustration and that it is adapted to govern any process variable the magnitude of which must be varied in accordance with a plotted curve in respect to time.

The objects enumerated above, together with other objects of my invention, will be more clearly understood when taken in connection with the following description and the accompanying drawings, in which Fig. 1 is a diagrammatic view of a digester with heat exchanger and a time cycle recorder controller embodying my invention adapted to govern the temperature of the digester cook and to record the temperature and pressure.

Fig. 2 is an enlarged view in perspective of a part of the time cycle control mechanism included in the controller shown in Fig. 1.

Fig. 3 is an enlarged sectional view showing a portion of an instrument case including a cam and chart with associated clamping and driving mechanism embodying my invention.

Fig. 4 is a plan view of the parts shown in Fig. 3.

Fig. 5 is an enlarged sectional view showing a modified form of chart and cam mounting embodied in my invention.

Fig. 6 is an enlarged view of the reset arm with adjustable cam follower shown in Fig. 2.

Having reference to the drawings and particularly to Fig. 1, I have shown a digester 10 and a heat exchanger 11 of any usual construction commonly employed in cooking wood pulp. The heat exchanger may be provided with tubes 12 for the circulation of an acid solution to the digester by means of pipes 13 and an acid pump 14, a suitable acid feed line 15 controlled by a valve 16 being also indicated. Steam may be supplied to the heat exchanger through a line 17 from a source not shown, and the condensate may be removed through an outlet 18 under the control of an automatic level device also not indicated. A back pressure valve 19 in a vent line 20 may serve to control the digester pressure, although a controller embodying my invention may be used for this purpose.

At 21 is shown a time cycle temperature recorder controller included in a standard recording case 22 provided with a hinged door 23 having the usual glassed-in opening 24 to enable a chart record 25 and cam 26 to be observed. As herein shown, the instrument is of the air operated type and is responsive to the acid solution temperature by means of a thermometer 27, thermal tubing 28, and Bourdon coil 29, the last mentioned being shown in Fig. 2. Air under pressure may be supplied to the instrument from any suitable source through a line 30, and a motor valve 31, herein shown as of the diaphragm operated type, may be used to control the flow of steam to the heat exchanger 11 as governed by the instrument.

For purposes of illustration I have shown a simple form of air operated control mechanism with control point reset. This may consist of a control couple comprising a nozzle 32 and a flapper 33, the former being pivotally mounted at 34 on a shaft 35 which is in turn rotatably secured in a suitable bearing 36 attached to a plate 37 in the case 22, and the latter being fast to the shaft and rotatable therewith and being provided with a suitable recording pen 38. The helical coil 29 is mounted on the plate 37 around the shaft 35 and its free end carries an arm 39 which is also secured to the shaft and is adapted to rotatably position the shaft in accordance with the temperature of the digester acid solution. The helical coil 29 is so arranged that it unwinds in a counterclockwise direction on an increase in temperature, moving the flapper 33 away from the nozzle 32, and turns clockwise on a decrease in temperature to cause the flapper to approach the nozzle. The air supply line 30 may be provided with a restricted orifice 40 and connect with the nozzle 32 by flexible tubing 41, the capacity of the orifice being less than that of the nozzle so that the relative position of the flapper and nozzle determines the nozzle line pressure. By means of a pipe 42 the pressure in the nozzle line is communicated to a diaphragm 43 of the motor valve 31 and the motor valve assumes an opening in accordance with said pressure. As herein shown, the motor valve is of the reverse acting type, i. e., it opens on an increase of fluid operating pressure and closes on a decrease of pressure under the influence of a suitable spring 44. It will be understood from the above that an increase in temperature of the acid solution causes the flapper 33 to move away from the nozzle 32 and thereby to reduce the pressure on the motor valve diaphragm 43 permitting the valve to move toward closed position and to cut down the flow of steam to the heat exchanger 11, and that on a decrease in temperature the opposite occurs.

Means for setting the temperature control point may include a set arm 45, more fully hereinafter to be described, which may be integral with the nozzle member 32 and by which the nozzle 32 may be positioned relatively to the flapper 33. When the nozzle is moved counterclockwise the amount of pressure required in the helical coil 29 to maintain the flapper 33 in controlling relation with the nozzle 32 is increased, and when the nozzle is moved clockwise the amount of coil pressure required is decreased. Thus the instrument may be set to a higher temperature control point by moving the nozzle counterclockwise, and vice versa, as is well known to those skilled in the art. While I have shown and described a very simple form of control couple, it is obvious that any type of responsive mechanism may be used.

To point out more clearly the advantages of the combination of elements herein disclosed, particularly in respect to the visibility of the entire recording chart surface, I have herein shown a two-pen recorder. As applied to a digester a second pen arm 50 pivoted on the shaft 35 may be used to record the digester pressure. This may be actuated by a helical coil 51 mounted on the plate 37 and responsive to the digester pressure through a pipe 52, the free end of the coil being adapted to rotate a shaft 53 to which the pen arm 50 is operatively connected by arms 54 and a link 55.

Having reference to Fig. 3, means for mounting and rotating the chart 25 may include the usual clock mechanism 60, herein shown diagrammatically, having a clock shaft 61 provided with a flanged member 62 for supporting the chart 25 over a suitable chart plate 63 mounted in the instrument case 22 on posts 64. The chart is clamped against the flanged member 62 by an annular flange 66 on a chart knob 67, the knob having an extension 68 received through an opening in the chart and threaded into the member 62.

In order to provide the mechanism hereinabove described with a time cycle operating cam of requisite size, which would normally obstruct the view of a substantial portion of the chart surface, and in order to adapt the mechanism to a standard instrument case with the advantages enumerated, I furnish a cam 26 of transparent material which may be mounted on the clock shaft 61 if desired, covering the entire chart surface if necessary and still affording a complete view of the chart record and recording pen. The transparent material employed may be of any suitable character, such as plastics, affording a reasonably clear vision of the chart, and preferably should be of a non-brittle material possessed of reasonable tensile strength and capable of holding its shape and of withstanding the usual wear and tear of operation, manufacture, and assembly. While a transparent material is preferred, a skeleton cam may be substituted, namely a cam of non-transparent material, such as metal or the like, having openings through which the chart record may be observed, although the former is more advantageous due to the completely unobstructed vision afforded and it is understood that the word "transparent," as herein used in connection with a cam, is intended to refer to a cam through which a substantially clear vision may be obtained. I regard the use of a transparent or equivalent cam in combination with a chart and associated recording, driving, and reset mechanism as an important improvement in the art, for so far as is known to me it has been found necessary heretofore and has been the practice of instrument manufacturers to supply a separate recorder instrument in connection with a time cycle controller, with its attendant disadvantages.

To provide means for mounting the cam 26 and for driving it at the same speed as the chart 25 or at selected speeds relatively thereto, I preferably employ a bridge plate 70 which is hinged at 70' to a bracket 71 secured to an independent clock mechanism indicated at 72. The bridge plate 70 has a projection 73 which engages with a snap spring 74 secured to the bracket 71 so that the bridge plate may be swung over the chart 25 or away from the chart to enable the chart to be applied to or removed from the chart support 62. The bridge plate is adapted to carry a suitable driving mechanism which may include a pair of sprockets 75 and 76 connected by a chain 77. The sprocket 75 is secured to a hub 78 by screws 79, the hub comprising a hollow cylindrical member 80 having a flange 81 integral therewith and a detachable flange ring 82 into which the screws 79 are threaded. Between the flange ring 82 and the bridge plate 70 is a washer 83, the parts being so arranged that the hub makes a sliding fit with the bridge plate and is capable of being rotated relatively thereto. The flange ring 82 has an annular shoulder 84 which is received within a corresponding opening in the cam 26, the latter being secured to the flange ring by screws 85. The central opening in the hollow cylindrical member 80 is adapted to receive the chart knob 67 when the bridge plate 70 is swung into operating position, the snap spring 74 serving to hold it in position against an adjustable stop 86 which engages a projection 87 on the bracket 71. A cap 88 is preferably employed to cover the outer end of the hub 78 and may be detachably secured thereto by screws 89.

The auxiliary clock mechanism 72 may be used to operate a shaft 90 having a coupling 91 threaded to its outer end and provided with a plurality of slots 92 oppositely disposed in the wall of a central opening 93 formed in the coupling. The sprocket 76 is secured to a hub 94, as by a driving fit over a shoulder 95, and the hub is rotatably mounted in a suitable opening in the bridge plate 70 between a fixed flange 96 and a hand nut 97 threaded on a hub extension 98 against a shoulder 99. A cylindrical extension 100 on the lower end of the hub may be received within the opening 93 in the coupling 91 and is provided with a driving pin 101 which is adapted to cooperate with two oppositely disposed slots 92 and to connect the sprocket 76 with the clock shaft 90 when the bridge plate 70 is swung into operating position. Thus the cam 26 may be rotated at any selected rate by the sprocket and chain drive depending on either the relative size of the sprockets or the relative clock rotation, the bridge plate 70 acting as a means of centering the cam 26 over the main clock shaft 61. While I have elected to use a separate clock mechanism for rotating the cam, it will be understood that the chart clock may be used for this purpose by providing any form of suitable gear train.

The driving mechanism just described is preferred for the reason that it may be used for any selected chart and cam speeds, but in many applications the chart and cam cycle may be synchronous and the cam may therefore be detachably mounted on and driven by the main clock shaft 61 as shown on the modified view in Fig. 5. For this purpose the chart support member 62 may be provided with a combined chart clamping and cam supporting knob 110 having a threaded extension 111 and an annular clamping surface 112 similar to that on the chart knob 67 shown in Fig. 3. The cam 26 is secured to a washer 212, as by screws 113, which is received over a cylindrical portion 114 of the knob 110 and rests against a shoulder 115 so that it may be rotated to any desired position. The cam is frictionally held against rotation by a spring 116 which surrounds the cylindrical hub portion 114 and is retained between the washer 212 and a hand member 117 threaded onto the end of the knob. Thus the knob affords a combined means for permitting both the chart and the cam to be applied or removed and for clamping the chart and securing the cam in any selected positions.

The detail in Fig. 6 shows means for operating the control reset arm 45 by the cam 26, which means is by reason of the transparent cam material enabled to function effectively with the other parts. As referred to above, it is sometimes necessary to vary the end point for various process cycles without varying the time rate of change of the value curve, as for example to vary the cook temperature of a sulphite digester from one cook to another due to changes in chips, acid, etc., but to maintain the same time curve, namely period of temperature rise, period of maximum temperature, and period for shutting down the digester and recharging. In sulphite digester cooking the maximum high temperature range from one cook to another may be from 120° C. to 140° C., and to provide maximum temperature points throughout this range it has been customary to supply separate cams arranged to afford temperature settings at 1° intervals throughout the range. It has therefore been usual to provide each sulphite digester controller with as many as twenty cams.

The device illustrated is herein combined with a transparent or equivalent cam, thereby rendering it practicable to mount a recording chart with associated recording mechanism in the same instrument case with the cam, and at the same time to provide for various control point settings from a master cam the pen records of which are clearly visible to the operator. It comprises a scale arm 120 secured transversely of the set arm 45; a micrometer screw 121 journalled at 122 and 123 in the scale arm; a follower block 124 threaded on the micrometer screw and adapted to be moved across the axis of the set arm 45 by a hand member 125 integral with the micrometer screw; and a follower 126 secured to the block 124 and having an indicator 127 which projects over the scale arm 120 and cooperates with a suitable scale 128. The scale 128 may be calibrated in conformity with the chart divisions and the set arm 45 may be positioned at any selected point within or without the periphery of the cam to adjust the control point below or above that called for by the master cam. This permits the use of a full-sized cam in conformity with the chart graduations and provides means for setting the cycle to any desired value on the chart. In accordance with this arrangement the scale 128 may be calibrated on each side of a mid-position coincident with the set arm axis, and by adjusting the follower to the left or the right along the scale the selected setting may be obtained. By providing graduations on the scale in conformity with the chart divisions an accurate means for changing the control setting is afforded, and by reason of the transparent cam the chart record may be seen by the operator whether the setting is at a point inside or outside of the cam periphery.

It will be apparent from the drawings and the description that the transparent cam cooperates with a central mounting for both the cam and chart, making it possible to use a cam comparable in size to a standard chart, which is equally adapted for the control of various process cycles and which may be mounted at the front of the instrument assembly and still afford an unobstructed view of the chart and pen. Again, it makes it possible to use mechanism in combination with the central mounting for driving the cam and chart at different speeds, and further to use a master cam in connection with the control point reset mechanism by which various control settings may be made relatively to the cam value curve without interrupting the view of the chart record.

While particular embodiments of the invention have been shown for purposes of illustration, it is to be understood that the invention is capable of various uses and that various changes and modifications may be made therein.

I claim:

1. In a time cycle controller having a condition value setting mechanism, the combination with a chart and associated recorder mechanism, of a cam and associated means for governing the control setting of said condition value setting mechanism, a rotatable shaft on which said chart is mounted, a bridge extending over said chart and pivotally mounted at one side thereof, said cam being rotatably mounted over said chart on said bridge, and having its axis of rotation substantially in axial alignment with the axis of said shaft, cam driving mechanism associated with said bridge, and means for operating said cam driving mechanism and for rotating said chart at predetermined rates in respect to time.

2. In a time cycle controller, in combination, a condition value responsive mechanism for maintaining the magnitude of a condition at a predetermined value, setting mechanism for establishing the magnitude at which said condition is to be maintained by said condition value responsive mechanism, a circular chart having radially spaced indicia thereon adapted to represent the value of a condition throughout a period of time, a shaft on which said chart is mounted, recording mechanism operated by said condition value responsive mechanism for scribing on said chart the magnitude of said condition value as maintained by said condition value responsive mechanism, a master cam plate rotatably mounted in front of said chart substantially axially of said shaft having an operating surface disposed in relation to said axis the radial dimensions of which substantially correspond to the radial dimensions of a master curve scribed on said chart representing a selected value curve of a condition over a predetermined period of time, means for rotating said cam and chart at a predetermined rate in respect to time, an arm in operative connection with said setting mechanism pivoted to swing across a face of said cam and chart in a plane substantially perpendicular to the axis of said shaft, the radial distance of the free end of said arm from the axis of said shaft being substantially equal to the radial distance from said axis of a curve scribed on said chart by said recording mechanism when the value magnitude of said condition is maintained by said condition responsive mechanism at the setting established by said arm, a follower coacting with the operating surface of said cam in operative connection with said arm, and means for adjusting said arm in relation to said follower to swing said arm to a selected point between the operating surface of said cam and the axis of said shaft whereby the chart record scribed by said recording mechanism is nearer to the axis of said shaft than the operating surface of said cam, said cam being transparent to provide a clear view of the chart record scribed by said recording mechanism.

3. In a time cycle controller, in combination, a condition value responsive mechanism for maintaining the magnitude of a condition at a predetermined value, setting mechanism for establishing the magnitude at which said condition is to be maintained by said condition value responsive mechanism, a circular chart having radially spaced indicia thereon adapted to represent the value of a condition throughout a period of time, a shaft on which said chart is mounted, recording mechanism operated by said condition value responsive mechanism for scribing on said chart the magnitude of said condition value as maintained by said condition value responsive mechanism, a master cam plate rotatably mounted in front of said chart substantially axially of said shaft having an operating surface disposed in relation to said axis the radial dimensions of which substantially correspond to the radial dimensions of a master curve scribed on said chart representing a selected value curve of a condition over a predetermined period of time, means for rotating said chart and cam at a predetermined rate in respect to time, an arm in operative connection with said setting mechanism pivoted to swing across a face of said cam and chart in a plane substantially perpendicular to the axis of said shaft, the radial distance of the free end of said arm from the axis of said shaft being substantially equal to the radial distance from the axis of said shaft of a curve scribed on said chart by said recording mechanism when the value magnitude of said condition is maintained by said condition responsive mechanism at the setting established by said arm, a follower coacting with the operating surface of said cam, an adjustable mounting on said arm to which said follower is connected, and means for adjusting said mounting to swing said arm to a selected point between the operating surface of said cam and the axis of said shaft whereby the chart record scribed by said recording mechanism is nearer to the axis of said shaft than the operating surface of said cam, said cam being transparent to provide a clear view of the chart record scribed by said recording mechanism.

4. In a time cycle controller, in combination, a condition value responsive mechanism for maintaining the magnitude of a condition at a predetermined value, setting mechanism for establishing the magnitude at which said condition is to be maintained by said condition value responsive mechanism, a circular chart having radially spaced indicia thereon adapted to represent the value of a condition throughout a period of time, a shaft on which said chart is mounted, recording mechanism operated by said condition value responsive mechanism for scribing on said chart the magnitude of said condition value as maintained by said condition value responsive mechanism, a master cam plate rotatably mounted in front of said chart substantially axially of said shaft having an operating surface disposed in relation to said axis the radial dimensions of which substantially correspond to the radial dimensions of a master curve scribed on said chart representing a selected value curve of a condition over a predetermined period of time, means for operating said cam and chart at a predetermined rate in respect to time, an arm in operative connection with said setting mechanism pivoted to swing across a face of said cam and chart in a plane substantially perpendicular to the axis of said shaft, the radial distance of the free end of said arm from the axis of said shaft being substantially equal to the radial distance from said axis of a curve scribed on said chart by said recording mechanism when the value magnitude of said condition is maintained by said condition responsive mechanism at the setting established by said arm, a follower coacting with the operating surface of said cam, a mounting on said arm to which said follower is connected, means for adjusting said mounting to swing said arm to a selected point between the operating surface of said cam and the axis of said shaft whereby the chart record scribed by said recording mechanism is nearer to the axis of said shaft than the operating surface of said cam, and a scale associated with said arm and follower having indicia thereon, the unit spacing of which is calibrated to correspond to the unit spacing of indicia on a portion of said chart to enable said arm to be pre-set in relation to said cam operating surface to vary the condition value setting on said chart to a point which is nearer to the axis of said shaft than the operating surface of said cam by an amount indicated on said scale, said cam being transparent to provide a clear view of the chart record scribed by said recording mechanism.

5. In a time cycle controller, in combination, a condition value responsive mechanism for maintaining the magnitude of a condition at a predetermined value, setting mechanism for establishing the magnitude at which said condition is to be maintained by said condition value responsive mechanism, a circular chart having radially spaced indicia thereon adapted to represent the value of a condition throughout a period of time, a shaft on which said chart is mounted, recording mechanism operated by said condition value responsive mechanism for scribing on said chart the magnitude of said condition value as maintained by said condition value responsive mechanism, a master cam plate rotatably mounted in front of said chart substantially axially of said shaft having an operating surface disposed in relation to said axis, the radial dimensions of which substantially correspond to the radial dimensions of a master curve scribed on said chart representing a selected value curve of a condition over a predetermined period of time, means for rotating said cam and chart at a predetermined rate in respect to time, an arm in operative connection with said setting mechanism mounted to move over a face of said chart and adapted to vary the setting of the condition value setting mechanism to govern the value of the condition in accordance with a selected curve to be scribed on said chart by said recording mechanism, a follower coacting with the operating surface of said cam in operative connection with said arm, and means for adjusting said arm in relation to said follower to vary the setting to obtain a record curve on said chart corresponding to the configuration of said cam, which curve may be disposed at selected points between the operating surface of said cam and the axis of said shaft, said cam being transparent to provide a clear view of the chart record scribed by said recording mechanism.

6. In a time cycle controller, in combination, a condition value responsive mechanism for maintaining the magnitude of a condition at a predetermined value, setting mechanism for establishing the magnitude at which said condition is to be maintained by said condition value responsive mechanism, a circular chart having radially spaced indicia thereon adapted to represent the value of a condition throughout a period of time, a shaft on which said chart is mounted, recording mechanism operated by said condition value responsive mechanism for scribing on said chart the magnitude of said condition value as maintained by said condition value responsive mechanism, a master cam plate rotatably mounted in front of said chart substantially axially of said shaft having an operating surface disposed in relation to said axis the radial dimensions of which substantially correspond to the radial dimensions of a master curve scribed on said chart representing a selected value curve of a condition over a predetermined period of time, means for rotating said cam and chart at a predetermined rate in respect to time, an arm in operative connection with said setting mechanism mounted to move over a face of said cam and chart in a plane substantially perpendicular to the axis of said shaft, the radial distance of a portion of said arm from the axis of said shaft being substantially equal to the radial distance from said axis of a curve scribed on said chart by said recording mechanism when the value magnitude of said condition is maintained by said condition responsive mechanism at the setting established by said arm, a follower coacting with the operating surface of said cam in operative connection with said arm, and means for adjusting said arm in relation to said follower to move said arm to a selected point between the operating surface of said cam and the axis of said shaft whereby the chart record scribed by said recording mechanism is nearer to the axis of said shaft than the operating surface of said cam, said cam being transparent to provide a clear view of the chart record scribed by said recording mechanism.

NIKOLAI BELAEF.